W. EDENBORN.
APPARATUS FOR EXTRACTING RESIN AND ALLIED PRODUCTS.
APPLICATION FILED JUNE 3, 1918.
1,351,629.
Patented Aug. 31, 1920.
3 SHEETS—SHEET 1.
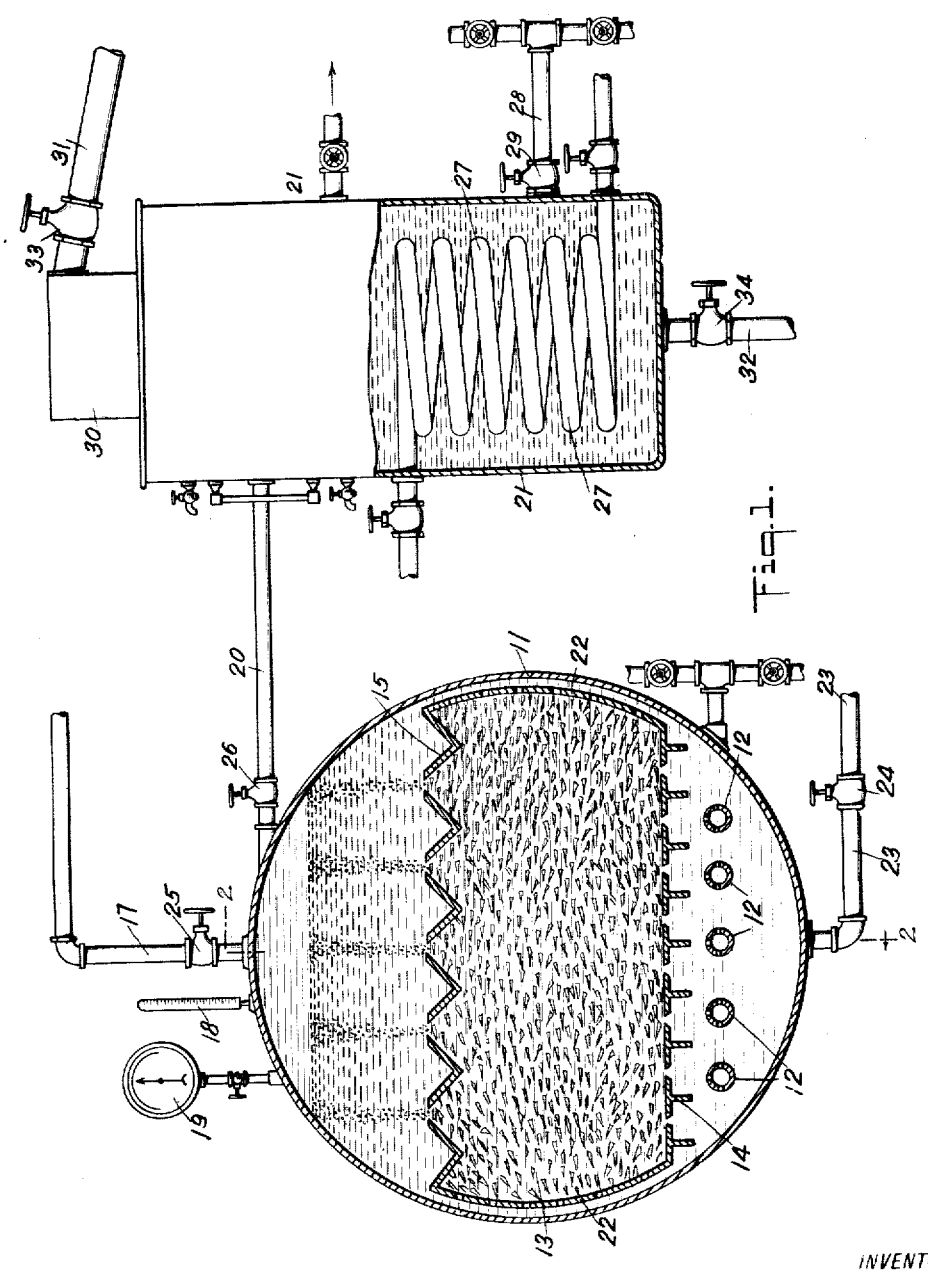
WITNESSES
INVENTOR
William Edenborn
BY
ATTORNEYS

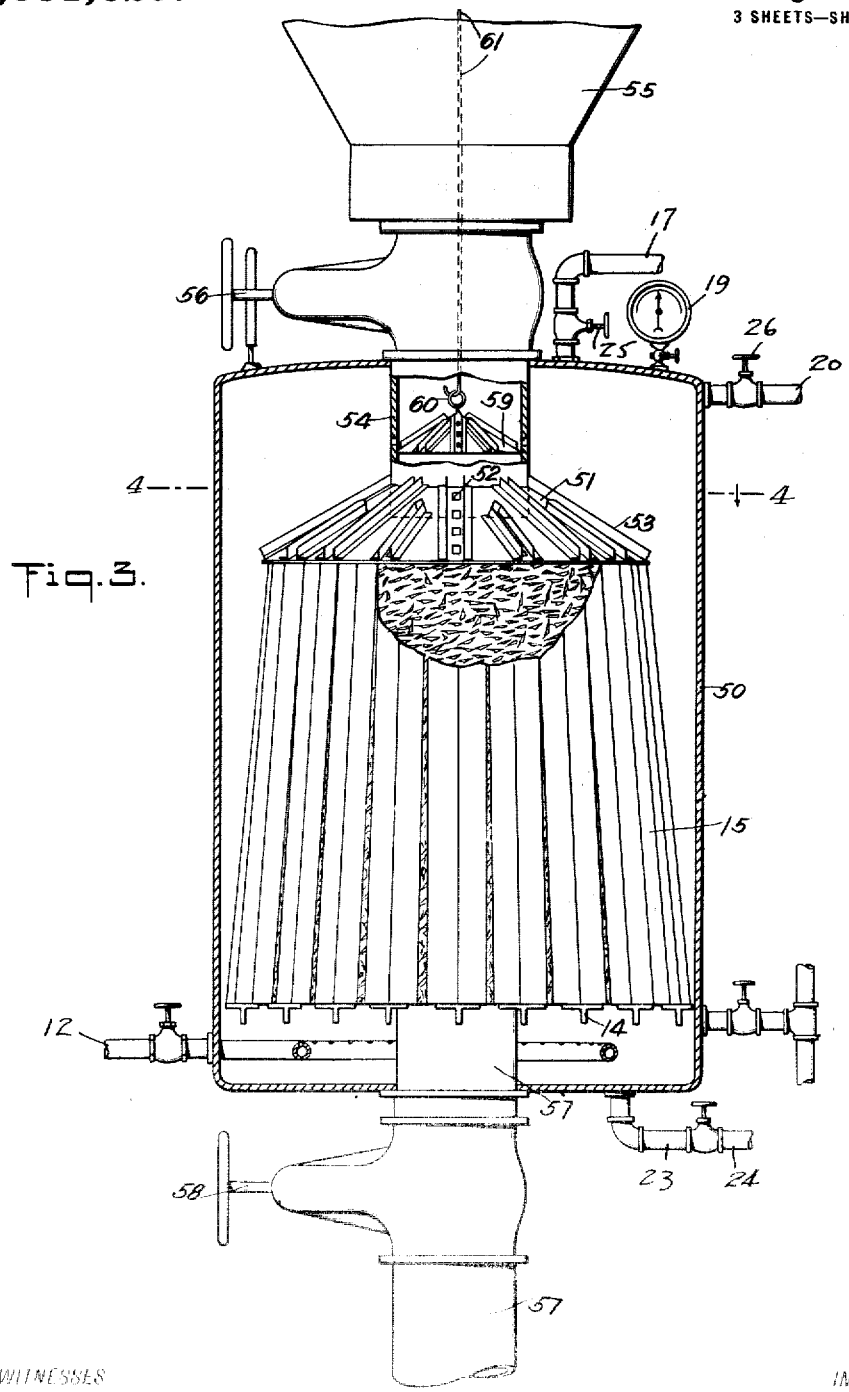

W. EDENBORN.
APPARATUS FOR EXTRACTING RESIN AND ALLIED PRODUCTS.
APPLICATION FILED JUNE 3, 1918.

1,351,629.

Patented Aug. 31, 1920.
3 SHEETS—SHEET 3.

INVENTOR
William Edenborn
BY
ATTORNEYS

UNITED STATES PATENT OFFICE.

WILLIAM EDENBORN, OF NEW ORLEANS, LOUISIANA.

APPARATUS FOR EXTRACTING RESIN AND ALLIED PRODUCTS.

1,351,629.	Specification of Letters Patent.	Patented Aug. 31, 1920.

Application filed June 3, 1918. Serial No. 238,010.

*To all whom it may concern:*

Be it known that I, WILLIAM EDENBORN, a citizen of the United States, and a resident of New Orleans, in the parish of Orleans and State of Louisiana, have invented a new and Improved Apparatus for Extracting Resin and Allied Products, of which the following is a full, clear, and exact description.

Among the principal objects which the present invention has in view are: to avoid re-treatment of wood particles for the separation of resin previously extracted therefrom; to reduce the cost of extraction and collection of resin from wood particles; to simplify the method of extracting resin and allied products from wood particles; and to reduce the time factor required for the extraction of said products from base materials carrying the same.

*Drawings.*

Figure 1 is a vertical section of an extracting tank and a separator constructed and arranged in accordance with the present invention;

Fig. 3 is a vertical section of an extracting tank constructed and arranged in accordance with a modified form of the invention;

*Description.*

Figure 2:
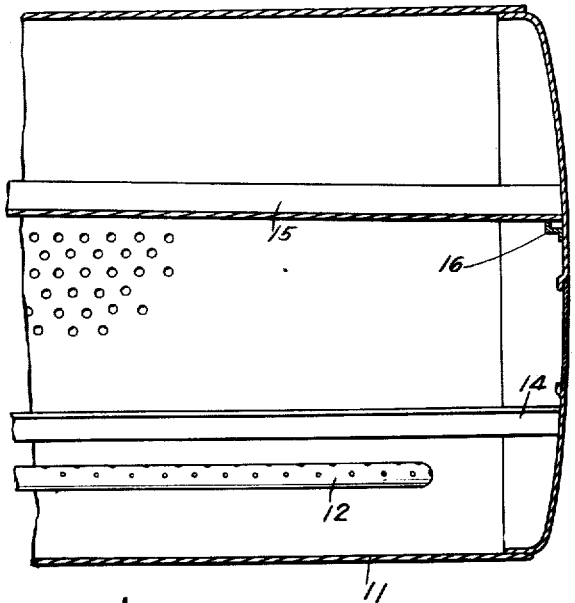
Fig. 2 is a longitudinal section of a portion of said tank, the section being taken as on the line 2—2 in Fig. 1.

Heretofore in extracting resin and terebinth from timber bearing the same, the practice has prevailed of placing the chips or comminuted wood in a suitable tank with water to be therein boiled until the terebinth or turpentine and resin become detached from the wood base. The lighter or more volatile products, such as the ethyl products, turpentine and pine oil, have been carried off in the form of vapor to be recondensed, while the heavier constituent, resin, has remained being precipitated after separation from the lighter volatiles. The resin thus precipitated has deposited on the surface of the wood particles. The wood particles carrying the deposit have been then treated with some suitable solvent, such as gasolene or alcohol, to be extracted from the wood by flotation, the dissolved product being finally recovered by a process of distillation and separation from the solvent employed.

It is to avoid the loss of the solvent employed in the recovery, the cost of plant necessary for the rehandling of the wood particles, and the labor and time incident to said rehandling, which are the objects of the present invention. With these purposes in view, the apparatus shown in the accompanying drawings is employed.

Referring to the said drawings, it will be seen that a tank 11 is provided with a series of steam or hot-water pipes 12, extended lengthwise of said tank and adjacent the bottom thereof. Directly above the pipes 12, is a container 13 for the chips or comminuted wood to be treated. The container 13 has a bottom formed of a series of grate bars or slats 14 constructed preferably as shown in Fig. 1 of the drawings, of T-iron, the edges of the flanges thereof being disposed in separated parallel relation to form slit-like openings in the bottom of the container. A cover is provided for the container, which consists of a series of U-shaped or V-shaped troughs 15, the edges of the troughs being disposed in spaced relation to form slots or elongated openings extending approximately the full length of the tank. The troughs 15 are preferably supported at the ends of the tank by gutters 16, shown in Fig. 2 of the drawings. The gutters 16 deliver the resin at the side of the tank and at the bottom thereof.

In the simplified form of the apparatus shown in Figs. 1 and 2, the tank 11 is cylindrical and is provided at the upper extremity or dome thereof, with a pipe 17, for carrying off the light distillates during the process of extraction. The usual gages 18 and 19 are provided, as well as the overflow pipe 20, which connects the tank 11 with the separator 21. To correspond with the shape of the tank 11, the container 13 has perforated side walls 22, the perforations wherein function as later set forth.

At the bottom of the tank 11, a draw-off pipe 23 is provided. The draw-off pipe 23 has a valve 24, and the pipes 17 and 20 are provided with valves 25 and 26, respectively.

When separated, the terbinth or turpentine and pine oil, float on the surface of the water, to the level of the pipe 20, through which they pass to the separator 21. In the separator 21, they are maintained at the proper height by a coil 27, through which steam for heating or water for cooling may pass to adjust the temperature below that in extractor until finally decanted by way of the pipe 28. The valve 29 controlling the pipe 28 is closed until the condensed water requires discharge. This is determined by the separation of the said charge into its different components, the heat furnished by the coil 27 being sufficient to liberate any ethyl products or light volatiles which may have come over in the floating of the lighter oils, the said volatiles being collected in the dome 30 to be conveyed thence by the pipe 31 to a suitable still, to be there condensed and stored. These oils which have overflowed from the tank 11 are apt to be heavily charged with resin, the same being held in suspension by the rising currents, owing to the heating of the product in said tank 11. This resin precipitates out of the oils and separates to the space in the separator 21 below the pipe 28. After the condensed water has been decanted by means of the pipe 28, the accumulated resin is drawn off by the pipe 32. It will be understood that the valves 33 and 34 are used to control the flow in the pipes 31 and 32, respectively.

When provided with an apparatus constructed in accordance with the simplified form above described and as shown in Figs. 1 and 2 of the drawings, the operation for extracting resin is as follows: The container 13 is charged or filled with the terebinth or turpentine - bearing chips or comminuted particles of wood. The charge having been perfected, hot water is introduced until the water level in the tank is raised to the desired height. The water level is usually carried above the troughs 15 and below the level of the overflow pipe 20. Heat is introduced either by means of steam through the tubes 12, or by means of dry heat supplied to the tank to heat the charge within said tank. As soon as heat is supplied, the valve 25 is opened. When the charge is heated to about the boiling point, the valve 26 is opened and valve 25 is closed. This process is reversed at intervals to permit the functioning of the pipes 17 and 20, said pipe 17 functioning to convey the lighter, and said pipe 20, the heavier terebinth to their respective receptacles. The water in boiling rises from the bottom of the tank 11 upward between the slats 14; also the free globules of terebinth rise upward. The rising columns of vapors being guided by the troughs 15, form rising columns of heated product through the zone above the said troughs.

As shown in Fig. 1 of the drawings, these rising columns of vapors or currents of heated liquid form what may be termed an active flotation zone, while between the columns and above the inverted centers of said troughs, relative quiescent or inactive zones are formed. As the heating proceeds, the terebinth or turpentine separates from the chips of comminuted particles, and is carried upward between the troughs 15 into the flotation zone above said troughs. In this zone, the terebinth or turpentine is decomposed to its constituent elements, the lighter volatiles, such as ethyl products, passing into the pipe 17 to be carried thereby to a condenser for the recovery in liquid form of said volatiles. The lighter oils, such as turpentine or pine oil, in separating, rise on the body of the liquid and, as above stated, accumulate until they overflow through the pipe 20 to the separator 21. The resins having a greater specific gravity than the water of the charge, precipitate through the body of water. During this precipitation of the resins, the upward currents of the boiling product deflect the descending precipitate or resin into the inactive or relatively quiet zones of the liquid body above the troughs 15. When the resin is in the inactive zone, it readily separates out and is deposited in the troughs 15. The troughs 15 are slightly inclined so that the resin accumulating therein flows quietly to the delivery end of said troughs for storage in the bottom of the tank 11, until drawn therefrom by means of the pipe 23. This process is continued until it is ascertained that the terebinth or turpentine has been totally removed from the chips or comminuted particles of wood.

A portion of the material from which resin is extracted is taken from stumps of trees which have been exposed to the weather for periods of time sufficient to permit the elimination of a considerable part of the lighter oils and volatiles. When this material is subjected to the extraction process above described, the resin being dissociated with a large proportion of the lighter materials, a portion of it is too heavy to float upward to above the troughs 15. To provide for this difficulty, when the charge is composed of the material mentioned, a second tier or level of troughs 15 is employed, the said tier being disposed in the container 13 midway between the slats 14 and the upper tier of troughs 15.

It will be understood that while this arrangement provides for protecting the chips and comminuted particles below the lower tier, it does sufficiently provide for the protection of the chips and particles above the lower tier and beneath the upper tier.

Figure 6:
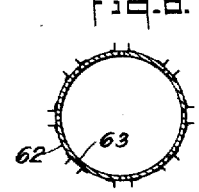
Fig. 6 is a cross section of the same, the section being taken as on the line 6—6 in Fig. 5.
Figure 5:
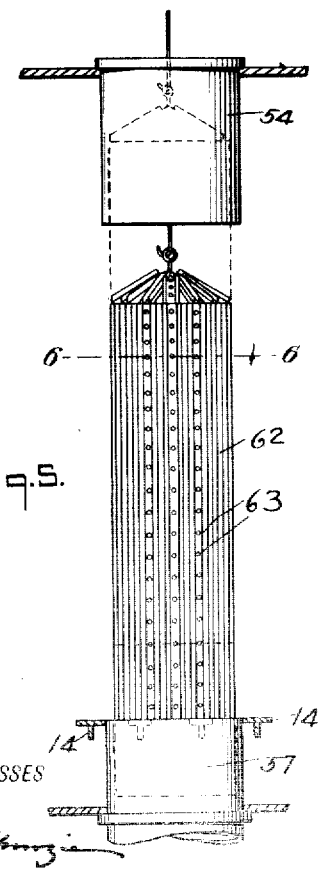
Fig. 5 is a side elevation of a modified detail of the invention for employment under special conditions.

The modified form of the invention, and particularly the modified detail shown in Figs. 5 and 6, is more efficacious in its result when used for the extraction of resins from the above-mentioned older material, or stumps of trees.

Figure 4:
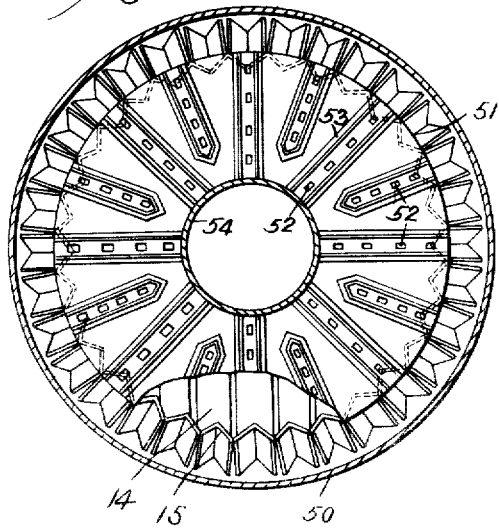
Fig. 4 is a horizontal section taken as on the line 4—4 in Fig. 3.

The modified form of the invention shown in Figs. 3 to 6, inclusive, employs an upright tank 50. Within the tank 50 is supported a container for chips and comminuted materials. The side walls of the container are formed of a plurality of troughs 15, shaped in cross section as are the troughs 15. The troughs 15 are supported in stacked relation upon the slats 14, which in the modified construction are disposed in parallel relation to each other, the ends of said slats being cut so that the combined structure conforms in its perimeter to the wall of the tank 50. The upper end of the container is covered by a top 51. The top 51 is tapered to provide inclined sides, which are pierced at suitable intervals by openings 52. The openings 52, as seen best in Fig. 4, are disposed in series to form the active zones or upwardly-moving columns of vapor or heated liquid in correspondence with the result shown and described in the construction disclosed in Fig. 1, and by the openings between the troughs 15 provided therein. A similar effect is produced by the openings between the troughs 15 in the modified form.

To prevent the resin passing through the openings 52, and to overcome any tendency to clog the said openings, guard rails 53 are provided, which form laterally-disposed projecting latches to guide the resin as the same delivers on the top 51, to the pendent edge thereof, from whence it is dropped to the troughs 15 below.

The top 51 is provided with a central passage through which extends a delivery pipe 54. The pipe 54 is in open communication with a hopper 55, wherever a gate valve 56 is manipulated to open the passage from the hopper to said pipe. A corresponding pipe 57 extends through the platform constructed of the slats 14, and operates as a delivery passage for the exhaust wood chips or charge of the container after the extraction has been completed. The gate valve 58 controls the passage through the pipe 57. The immediate entrance of the pipe 54 to the container is closed by a cover plug 59. The plug 59 is connected by means of a ring 60 with a hoisting cable 61.

In operation, the plug 59 is raised above the bottom opening of the pipe 54 and out of the way of the charge in the hopper 55. The valve 56 is then opened to permit the chips and comminuted material or charge for the extracting container to flow thereinto. When the container is filled to the desired extent, the cable 61 is manipulated to lower the plug 59. The upper surface of the plug 59 is constructed in correspondence with the upper surface of the cover 51, having the same steam openings and guard rails therefor, which function in the manner described with reference to said cover.

The modified detail shown in Fig. 5 is provided for permitting the escape of the heavy resin extracted from a weather-cured wood from which the lighter products have been leached. The modification consists in providing a tube 62, wherein a series of perforations 63 are formed for the passage of the heavier resin to the center of said tube, where it is either carried away by a conductor not shown in the drawings, or is impounded in the bottom of the tube, the lower end whereof is closed.

When employing this modified form of the tube, it is lowered into the container before the charge of chips is placed in said container. The tube 62 is lowered through the pipe 54 and into the pipe 57 at the bottom of the tank. The tube 62 is lowered sufficiently in the pipe 57 to permit the upper end of the said tube to open the lower end of the pipe 54, as shown best in Fig. 5 of the drawings. When in this position, the comminuted particles may be admitted to the container from the hopper 55. After the container has received its proper charge, the tube 62 is raised to the position shown by dotted lines in Fig. 5 of the drawings, and where the said tube serves to close the lower end of the pipe 54. After the extraction is complete, the valve 56 may be opened and the tube 63 with the resin impounded therein may be raised upward through the said hopper, thereby clearing the pipe 57, so that the chips and particles from which the resin and oils have been extracted, may be withdrawn from said container.

*Claims.*

1. An apparatus as characterized embodying a tank for heating a solution containing resin; and means disposed in said tank for arresting the resin contained in the solution when precipitating therefrom, said means embodying spaced receptacle devices for creating in the heated solution, a series of active and inactive areas, the former adapted for lifting said resin and the latter areas adapted for permitting the precipitation of said resin into the receptacle devices.

2. An apparatus as characterized embodying a tank for heating a solution containing resin; and means disposed in said tank for arresting the resin contained in the solution when precipitated therefrom, said means embodying a series of trough-like members disposed in spaced relation for dividing the solution above said trough-like members into relatively active and inactive zones for floating and precipitating the resin, respectively.

3. An apparatus as characterized embodying a receptacle for releasing resin from its associated substances; and means for separating the resin, said means embodying spaced receptacles for producing relatively agitated and quiet zones and for receiving the precipitated resin.

4. An apparatus as characterized having a container for the material provided with spaced trough-like members for creating a series of upwardly-flowing currents in a solution containing resin in suspension, said trough-like members also serving to receive the precipitated resin.

5. An apparatus as characterized, having a container for the material provided with a slotted bottom and with a cover having a plurality of spaced trough-like members.

6. An apparatus as characterized, having a container for the material provided with openings in its bottom and sides and with a top having openings and trough-like members.

7. An apparatus as characterized comprising a tank for heating a resin-bearing substance for extracting the resin therefrom by dissolving the same; and a series of settling members disposed above said substance, said settling members being arranged for creating upward currents in the solution in said tank, whereby settling areas vertically disposed above said members will be formed and the collecting of the resin when precipitated from the solution facilitated.

8. An apparatus as characterized embodying a tank for extracting in the form of a solution, the resin contained in wood particles; means for maintaining the solution above said wood particles; and means interposed between the body of said solution and said particles for collecting the resin and preventing the re-deposit of the same on said particles.

9. In an apparatus as characterized, a tank having gutters and a container arranged in the tank above the bottom of the same, said container having openings in its bottom and provided with a top having a plurality of spaced trough-like members discharging into the gutters of the tank.

10. In an apparatus as characterized, a tank having gutters on its ends, and a container supported in the tank with its ends spaced from the sides of the tank, said container having openings in its bottom and sides and provided with a top having a plurality of spaced trough-like members discharging into the gutters of the tank.

WILLIAM EDENBORN.